United States Patent [19]
Chen et al.

[11] Patent Number: 5,812,368
[45] Date of Patent: Sep. 22, 1998

[54] MONITOR VIEWING ANGLE ADJUSTING ASSEMBLY HAVING MONITOR MOUNTED ON TWO SUPPORTING ARM ASSEMBLIES VIA TURNING LIMIT ASSEMBLIES

[75] Inventors: Ray-Jei Chen, Tao-Yuan; Chih-Wen Lin, Pa Te, both of Taiwan

[73] Assignee: Kuo Feng Corporation, Taipei, Taiwan

[21] Appl. No.: 867,875

[22] Filed: Jun. 4, 1997

[51] Int. Cl.$^6$ .............................. G06F 1/16; H05K 7/16; E05D 11/06
[52] U.S. Cl. ............................. 361/681; 248/922; 16/376
[58] Field of Search ................................... 361/681, 682; 16/376; 248/917, 919, 921–923

[56] References Cited

U.S. PATENT DOCUMENTS

| | | | |
|---|---|---|---|
| 5,107,402 | 4/1992 | Malgouires | 361/681 X |
| 5,109,572 | 5/1992 | Park | 361/681 X |
| 5,187,641 | 2/1993 | Muskatello et al. | 361/682 |
| 5,590,021 | 12/1996 | Register | 361/681 |
| 5,646,818 | 7/1997 | Hahn | 361/681 |

*Primary Examiner*—Michael W. Phillips
*Attorney, Agent, or Firm*—Beveridge, DeGrandi, Weilacher & Young, LLP

[57] ABSTRACT

A monitor viewing angle adjusting assembly mainly including a monitor, a supporting arm assembly, and a base. The supporting arm assembly includes two parallel and symmetrical supporting arms which each includes a first arm portion and a second arm portion extending in opposite directions in one plane and slightly bent toward each other at their joint. The monitor and the base are pivotally connected to circular ends of the first and the second arm portions of the supporting arms, respectively, via turning-limit assemblies and locating brackets. The monitor can be turned relative to the supporting arms and the supporting arms can be turned relative to the base, so that the monitor can be adjusted to almost any angular position relative to the base and a viewer may select a viewing angle most suitable for him. When the monitor is adjusted to be parallel with the base, the whole monitor assembly can be hung on a vertical wall to effectively save the space required to pack and store the monitor assembly.

6 Claims, 7 Drawing Sheets

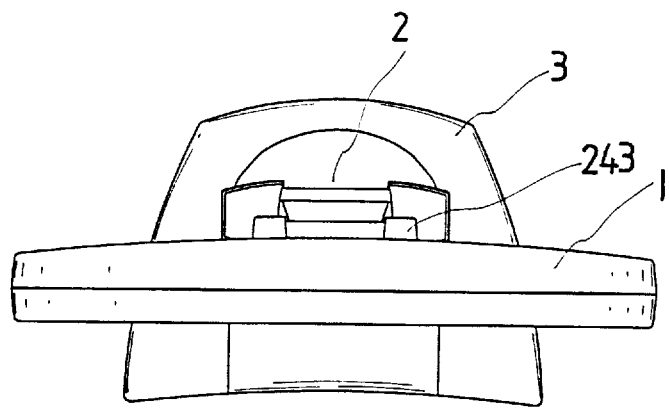
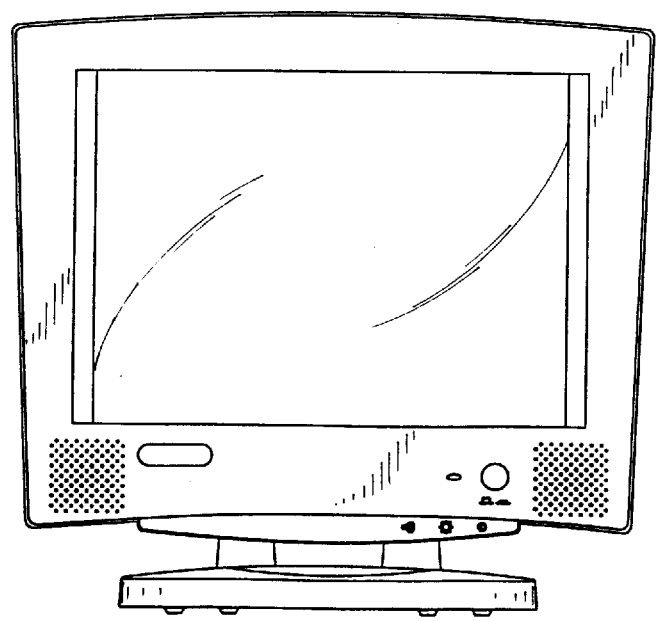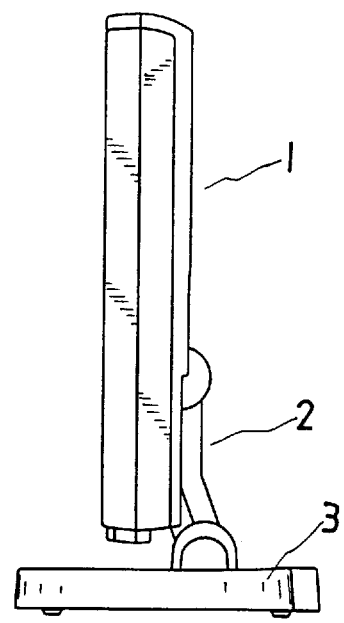

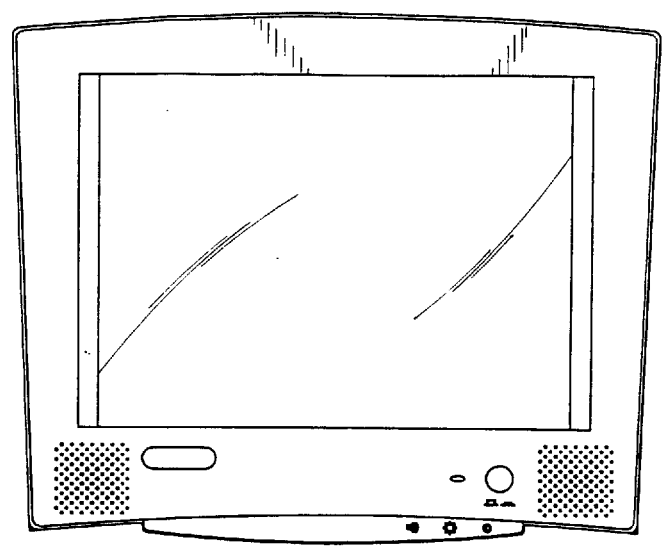
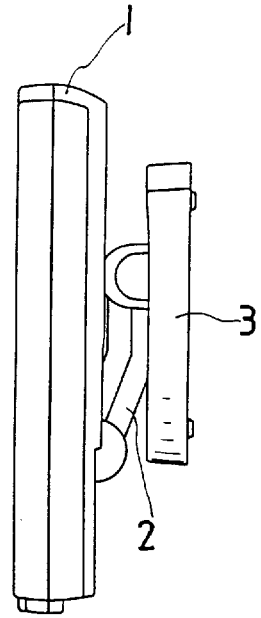
FIG. 7A　　　　FIG. 7B
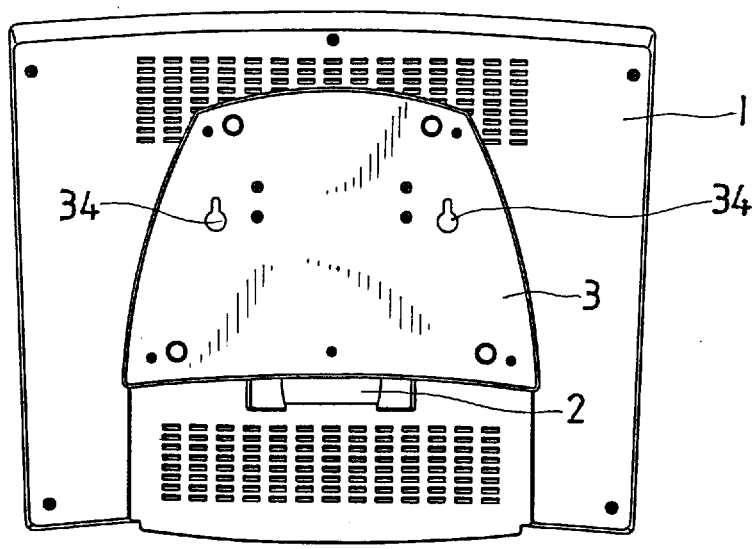
FIG. 7C

MONITOR VIEWING ANGLE ADJUSTING ASSEMBLY HAVING MONITOR MOUNTED ON TWO SUPPORTING ARM ASSEMBLIES VIA TURNING LIMIT ASSEMBLIES

FIELD OF THE INVENTION

The present invention relates to a monitor viewing angle adjusting assembly, and more particularly to a monitor viewing angle adjusting assembly in which a monitor is pivotally connected to two slightly bent supporting arms which are further pivotally connected to a base, so that the monitor can be steplessly adjusted to a most suitable inclination relative to a viewer's eyes or to a position which occupies a minimum storage space or permits the monitor assembly to be vertically hung on a wall to effectively reduce room required to pack and store the monitor assembly.

BACKGROUND OF THE INVENTION

General monitors for computer can be divided into two types. One of which has a bulky volume and is rotatably set onto a base. A viewer may hold the monitor with two hands to turn the monitor clockwise, counterclockwise, upward, or downward so as to adjust the monitor to a most suitable angular position relative to the viewer. Another type of monitor has a flat body which is usually used with a notebook computer by pivotally connecting its one edge to a main frame of the computer and can be close to the main frame when the computer is not in use.

The above-mentioned monitor of first type has gradually lost its attractiveness due to its inconvenience in use resulted from its bulky volume and only limited adjustment of its angular positions relative to the viewer. On the other hand, the second flat type monitor, due to its pivotal connection to the main frame of the computer by hinges or other functionally similar means, it can only be upward or downward turned about the hinges relative to the main frame of the computer while a biggest angle that can be contained between the monitor and the main frame is about 135 degrees. Moreover, the flat monitor can be securely located at its inclined position only when it is turned to the biggest angle. The monitor shall fail to be securely located in place at other smaller angles relative to the main frame after it has been closed to and extended from the main frame too many times.

It is therefore tried by the inventor to develop a monitor assembly in which the monitor can be steplessly adjusted relative to its base to a most suitable viewing angle, or to be parallel with the base for the whole monitor assembly to be vertically hung on a wall to reduce space required to pack and store the monitor assembly.

SUMMARY OF THE INVENTION

A primary object of the present invention is to provide a monitor viewing angle adjusting assembly including a monitor, a supporting arm assembly, and a base. The supporting arm assembly includes two supporting arms which each includes a first arm portion and a second arm portion extending in one plane and slightly bent toward each other at their joint. The monitor and the base are pivotally connected to ends of the first and the second arm portions of the supporting arms, respectively, via turning-limit means and locating brackets. The monitor can be turned relative to the supporting arms and the supporting arms can be turned relative to the base, so that the monitor can be adjusted to almost any angular position relative to the base and a viewer may select a viewing angle most suitable for him. When the monitor is adjusted to be parallel with the base, the whole monitor viewing angle adjusting assembly can be hung on a vertical wall to effectively save the space required to pack and store the monitor.

Another object of the present invention is to provide the above monitor viewing angle adjusting assembly in which the ends of the first and the second arm portions of the supporting arms are provided with a lug each to project outward from and be perpendicular to the arm portions. The lug moves within a limit cut formed on a washer member included in the turning-limit means, defining the angles at which the monitor and the base can be turned relative to the supporting arms.

A futher object of the present invention is to provide the above monitor viewing angle adjusting assembly in which ornamental cover members and connecting caps are used to cover the supporting arms and the locating brackets, respectively, so that the whole monitor assembly has a beautiful appearance.

BRIEF DESCRIPTION OF THE DRAWINGS

The structure and functions of the present invention can be best understood by referring to the following detailed description of the preferred embodiment and the accompanying drawings, wherein

FIGS. 4A to 4C respectively illustrate a front elevational view, a side elevational view, and a top plan view of the present invention with the monitor in a position perpendicular to the base;

FIGS. 7A to 7C respectively illustrate a front elevational view, a side elevational view, and a rear elevational view of the present invention with the monitor in a position parallel to the base, so that the present invention can be conveniently hanging on a vertical wall surface.

DETAILED DESCRIPTION OF THE PREFERRED EMBODIMENT

Figure 1:
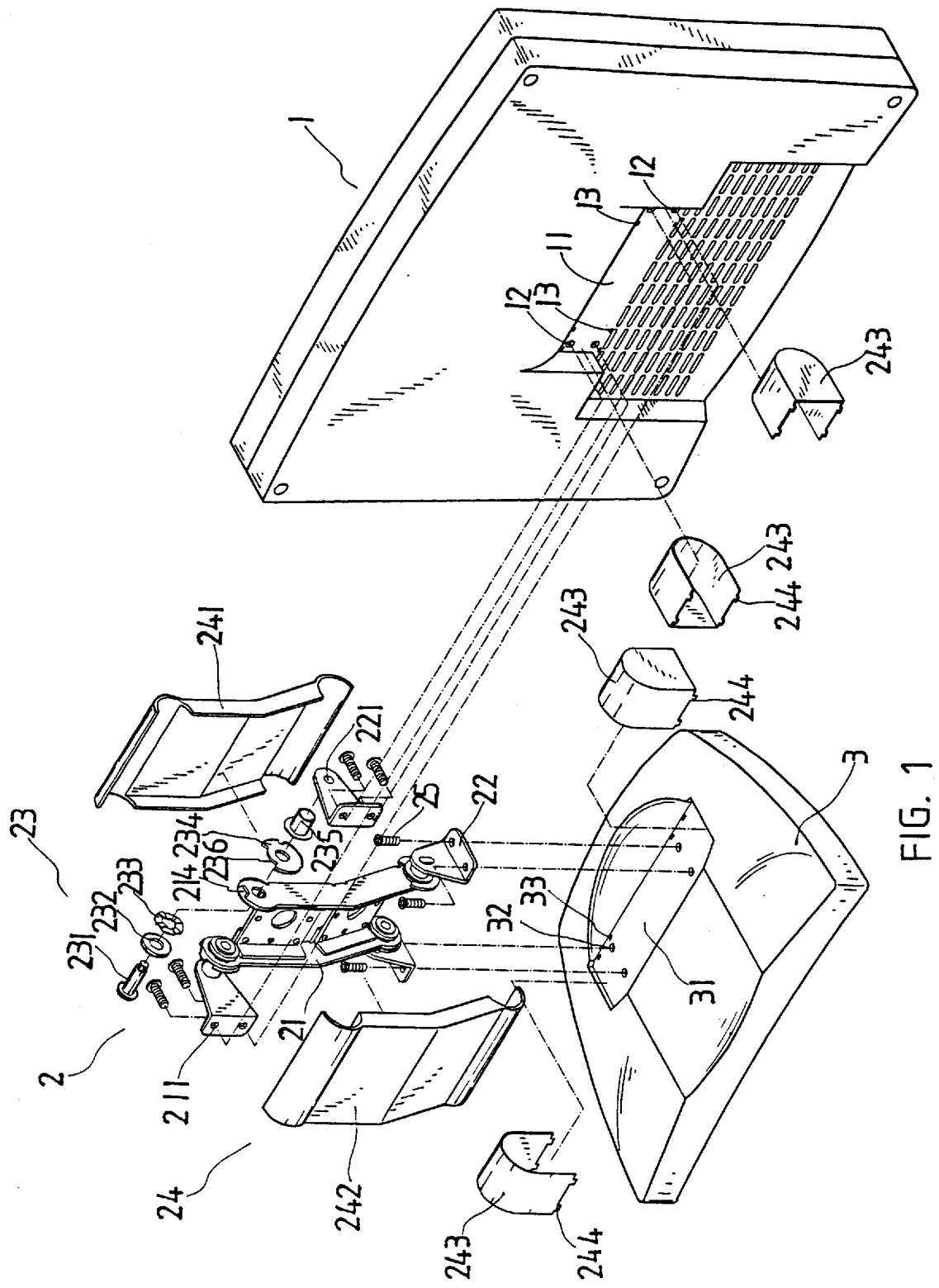
FIG. 1 is an exploded perspective of the monitor viewing angle adjusting assembly according to the present invention.
Figure 2:
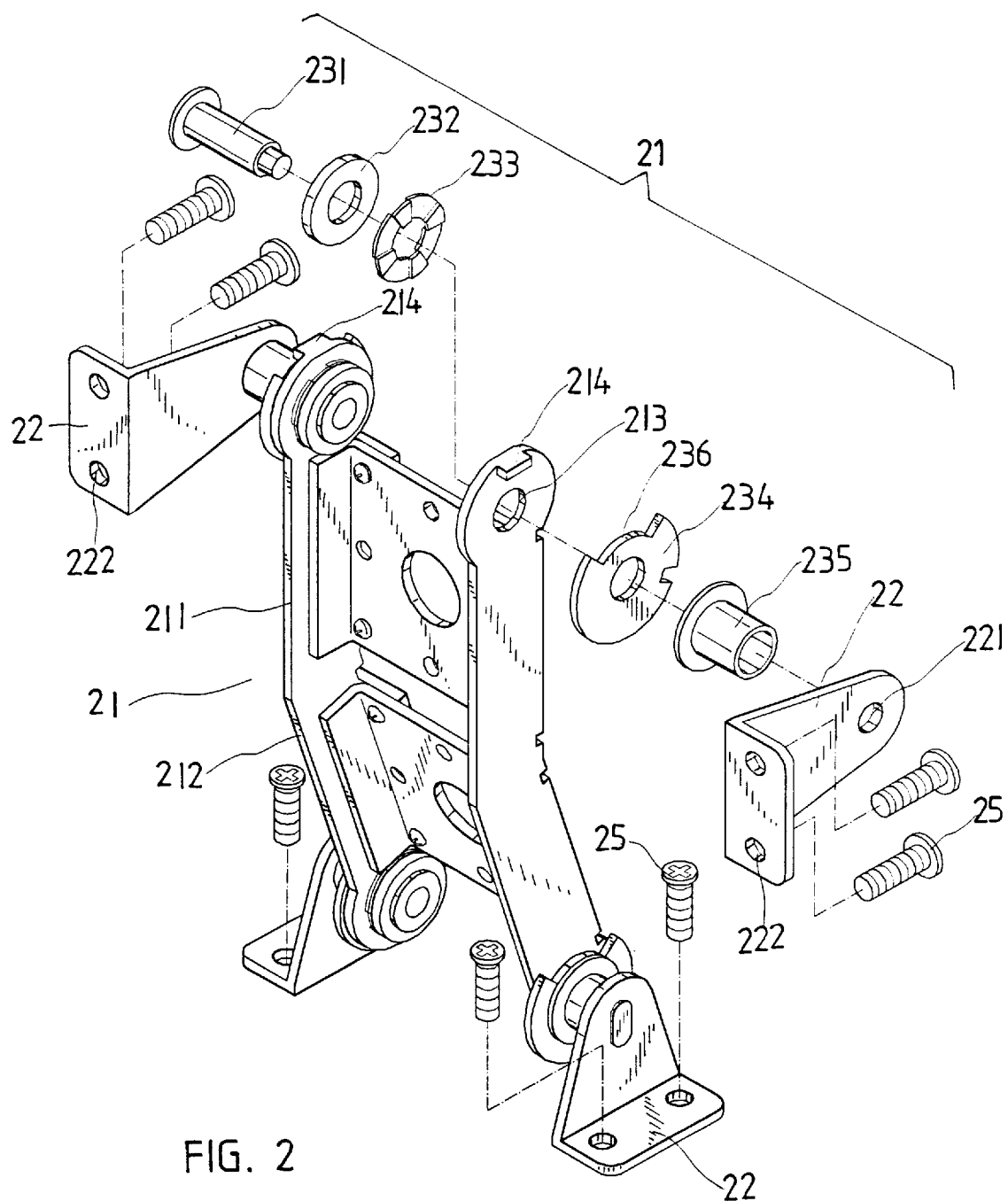
FIG. 2 is an exploded perspective showing a detailed structure of the supporting arms of the present invention.

Please refer to FIGS. 1 and 2. The present invention relates to a monitor viewing angle adjusting assembly which mainly includes a monitor 1, a supporting arm assembly 2, and a base 3.

The monitor 1 has a flat profile and is formed at a predetermined location on a backside with a flat recess 11. Screw holes 12 and retaining holes 13 are respectively symmetrically formed on two sides of the flat recess 11.

The supporting arm assembly 2 includes two parallel supporting arms 21, four locating brackets 22, four turning limit assemblies 23, and a set of ornamental cover members 24.

The two supporting arms 21 are two laterally symmetrical members and are distantly connected together by reinforcing webs. The supporting arms 21 and the reinforcing webs can be separately formed as shown in FIG. 2 or be integrally formed. Each supporting arm 21 includes a first arm portion 211 and a second arm portion 212 which extend in opposite directions in one plane and slightly bend toward each other at their joint to contain an angle about 160 degrees between them. The first and the second arm portion respectively have a circular end. Each circular end has a lug 214 outward projecting from and normal to a top outer edge of the end and has a central through hole 213.

Since the locating brackets have similar structure, only one of them is described hereinafter. The locating bracket 22 has an L-shaped profile and therefore includes a seat portion and a wall portion perpendicular to the seat portion. The wall portion is formed with a through hole 221 near its top to correspond to the central through hole 213 of the supporting arm 21, so that the locating bracket 22 can be connected at the wall portion to the circular end of the supporting arm 21. The seat portion of the locating bracket 22 is formed with two through holes 222 near two outer ends thereof for screws 25 to thread through and then firmly tighten into screw holes 12 formed in the recess 11 of the monitor 1 or screw holes 32 formed in a recess 31 of the base 3, respectively, to connect the locating bracket 22 at the seat portion to the monitor 1 or the base 3.

The four turning limit assemblies 23 have the same structure and only one of them is described hereinafter. The turning limit assembly 23 is assembled to and between the circular end of the supporting arm 21 and the wall portion of the locating bracket 22 and including a rivet 231 which extends through a first washer 232 and a spring washer 233 disposed at an inner side of the supporting arm 21 (that is, aside of the supporting arm 21 facing the other supporting arm 21), and then extends the central through hole 213 of the supporting arm 21, a second washer 234, a sleeve 235, and finally the through hole 221 on the wall portion of the locating bracket 22. The rivet 231 is then fixed at its end to and in the through hole 221 of the locating bracket 22. This arrangement allows the supporting arms 21 to pivotally turn about the rivets 231 relative to the locating brackets 22.

The second washer 234 of the turning limit assembly 23 is formed along its outer circumferential periphery with a limit cut 236 for the lug 214 projecting from the circular end of the supporting arm 21 to move therein. The cut 236 may have a length for the second washers 234 assembled to two circular ends of the first arm portions of the supporting aims 21 to be connected to the monitor 1 different from that for the second washers 234 assembled to two circular ends of the second arm portion of the supporting arm 21 to be assembled to the base 3, such that the monitor 1 can be pivotally turned relative to the supporting arms 21 and the supporting arms 21 to the base 3 independently to provide almost any angular position of the monitor 1 relative to the base 3.

The set of ornamental cover members 24 includes a first cover 241, a second cover 242, and four connecting caps 243. The first and the second covers 241 and 242 are formed at their end edges with supplementary flanges so that they together fitly enclose the two supporting arm 21 between them. The four connecting caps 243 respectively cover the locating brackets 22 connected to four circular ends of the supporting arms 21 and are provided at predetermined positions with outward projected hooking means 244 to engage into retaining holes 13 formed in the recess 11 of the monitor 1 and retaining holes 33 formed in the recess 31 of the base 3.

The base 3 serves to hold the whole monitor viewing angle adjusting assembly in a stable condition. The base 3 is provided at a top surface with a flat recess 31. Screw holes 32 are provided in the recess 31 at positions corresponding to screws 25 which are threaded through the holes 222 on the locating brackets 22 connected to the supporting arms 21, so that screws 25 can be firmly tightened into the base 3. And, retaining holes 33 are provided in the recess 31 at positions corresponding to hooking means 244 which project from the connecting caps 243 covering the locating brackets 22.

Figure 3:
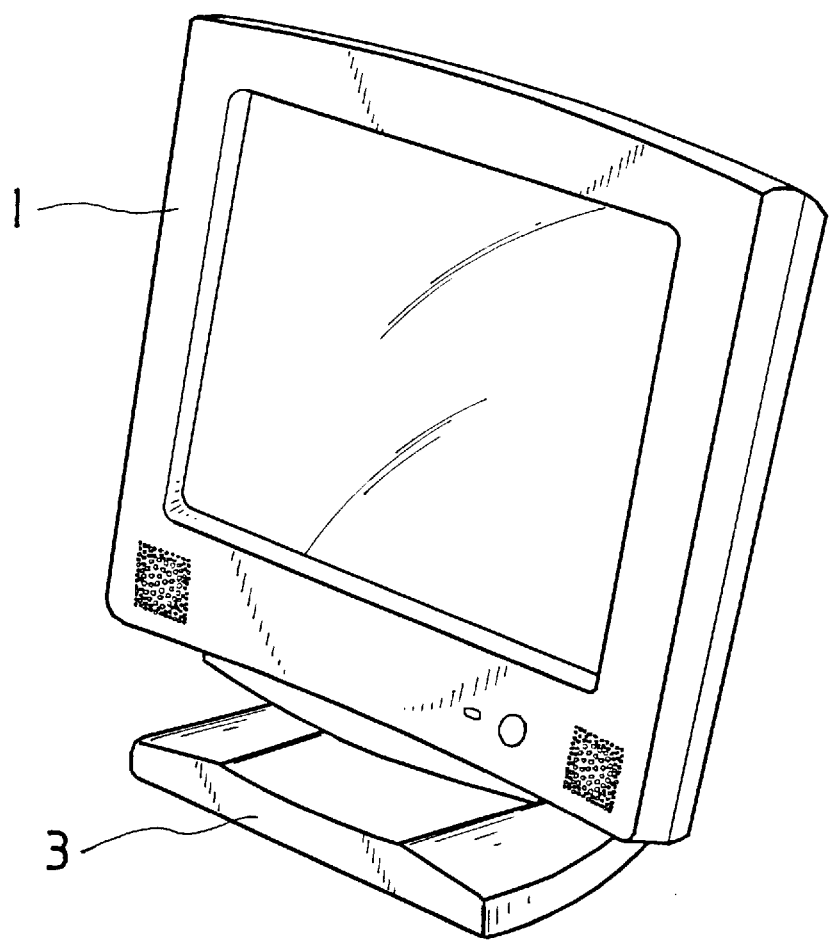
FIG. 3 is a perspective showing a preferred embodiment of the present invention in an assembled state.
Figure 5B:
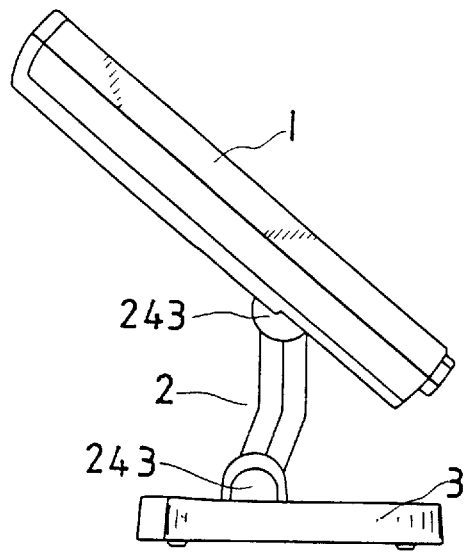
FIGS. 5A to 5D illustrate the monitor of the present invention in differently inclined positions relative to the base.
Figure 5A:
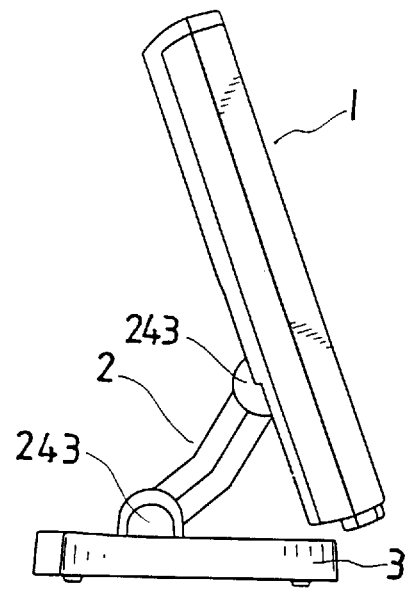
Figure 5D:
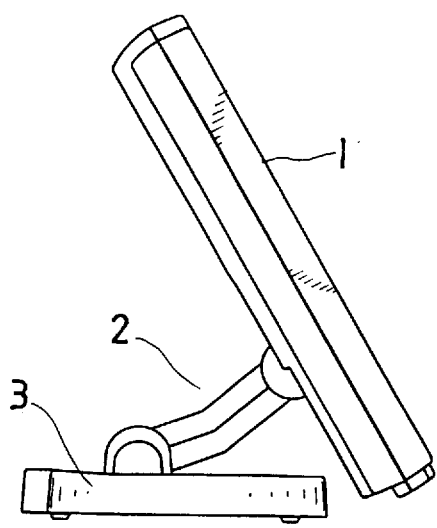
Figure 5C:
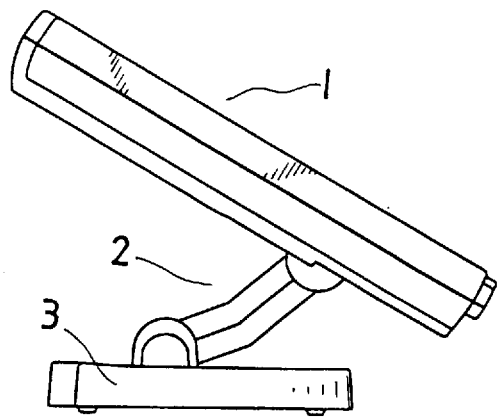
Figure 6B:
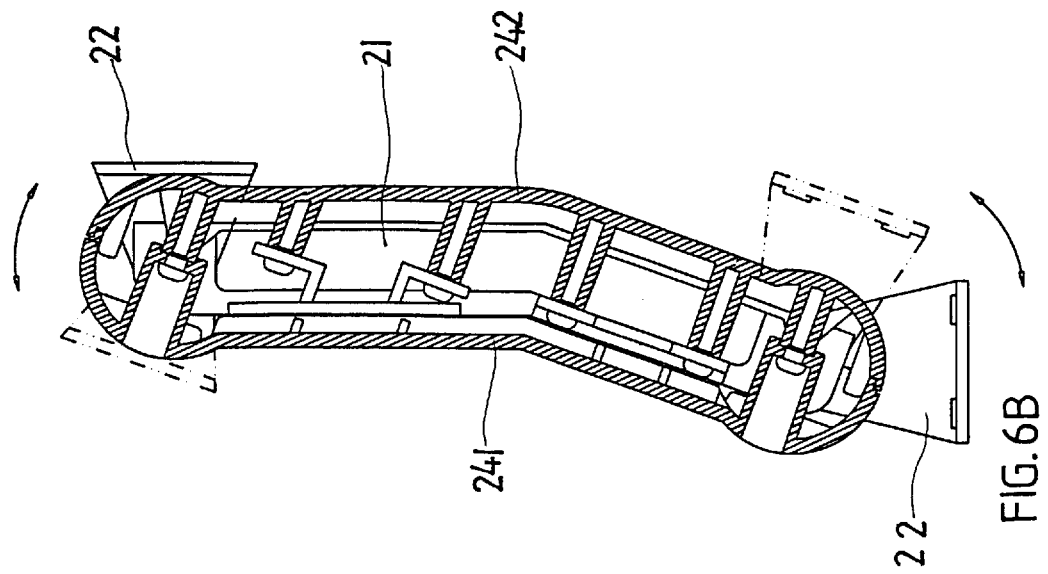
FIGS. 6A and 6B illustrate the locating brackets of the supporting arm assembly are pivotally turned to adjust the monitor to a viewing angle most suitable to the viewer.
Figure 6A:
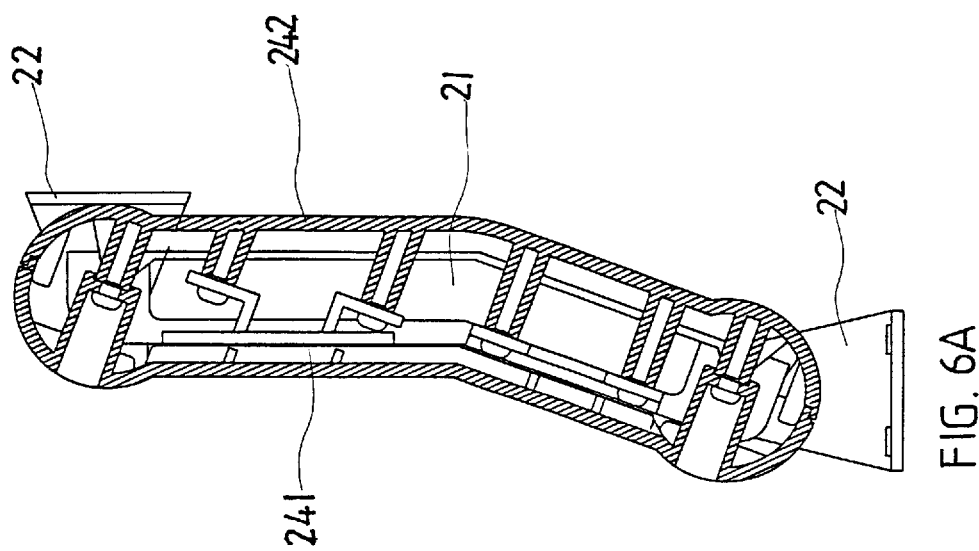

Please refer to FIGS. 3, 6A and 6B. After the monitor viewing angle adjusting assembly of the present invention is assembled, two of the locating brackets 22 connected at the wall portions to the two circular ends of the first arm portions of the two supporting arms 21 are locked at the seat portions to the monitor 1 and the other two of the locating brackets 22 connected to the circular ends of the second arm portions of the two supporting arms 21 are locked to the base 3 by tightening the screws 25 through the holes 222 on seat portions of the locating brackets 22 and the screw holes 12 formed in the recess 11 of the monitor 1 or the screw holes 32 formed in the recess 31 of the base 3. Such pivotally turnable connection relation between the supporting arms 21 and the locating brackets 22 plus the first and the second arm portions 211 and 212 of the supporting arms 21 that slightly bent toward each other in the same plane allows the monitor 1 to be more conveniently adjusted to any angular position which is most suitable for a viewer.

Please now refer to FIGS. 4A, 4B and 4C in which the supporting arms 21 and the monitor 1 are separately turned so that the monitor 1 becomes perpendicular to the base 3. In FIGS. 5A to 5D, the supporting arms 21 and the monitor 1 are separately turned so that the monitor 1 is in different inclined positions relative to the base 3 as required by the viewer.

In FIGS. 7A, 7B and 7C, the supporting arms 21 and the monitor 1 are separately turned so that the monitor 1 becomes parallel to the base 3. As particularly shown in FIG. 7C, there are hanging holes 34 formed at a bottom surface of the base 3 which allow the whole monitor viewing angle adjusting assembly of the present invention in the position as shown in FIG. 7B to be hung on a vertical wall surface or any other suitable place to effectively minimize space required for storing the monitor viewing angle adjusting assembly when it is not in use.

With the above arrangements, the present invention provides a monitor viewing angle adjusting assembly which has a firm and strong structure to allow the monitor thereof to be freely adjusted to almost any desired inclined position relative to the base thereof; and when the monitor viewing angle adjusting assembly is not in use, the monitor 1 can be adjusted to be perpendicular or parallel to the base 3 so as to occupy a minimum space. When the monitor 1 is adjusted to be parallel to the base 3, the whole monitor viewing angle adjusting assembly can be conveniently hung on a wall to save the space required to pack and store the whole monitor viewing angle adjusting assembly.

What is to be noted is the form of the present invention shown and disclosed is to be taken as a preferred embodiment of the invention and that various changes in the shape, size, and arrangements of parts may be resorted to without departing from the spirit of the invention or the scope of the subjoined claims.

What is claimed is:

1. A monitor viewing angle adjusting assembly comprising:
   a monitor having a flat profile and being formed at a predetermined location on a backside with a flat recess, in said recess a plurality of mounting holes being symmetrically formed at two sides of said recess;

a supporting arm assembly connecting at one end to said flat recess formed at said backside of said monitor such that said monitor can be pivotally turned to different inclined positions; said supporting arm assembly comprising two supporting arms which have locating brackets attached to every end thereof via turning limit assemblies, said locating brackets each including a wall portion and a seat portion normal to said wall portion; and a base for supporting said monitor viewing angle adjusting assembly in a stable condition and being formed at a top surface with a flat recess, in said recess of said base a plurality of mounting holes being symmetrically provided at two sides of said recess and connected to said supporting arm assembly via said locating brackets pivotally connected to two ends of said supporting arms opposite to said monitor.

2. A monitor assembly as claimed in claim 1, wherein said supporting arm assembly comprises:

two symmetrical and parallel supporting arms each of which including a first arm portion and a second arm portion extending in opposite directions in one plane, said first and said second arm portions slightly bending toward each other so as to contain an obtuse angle between them, said arm portion each having a circular end in which a central through hole is formed and a lug outwardly projecting from and perpendicular to said supporting arm;

said locating bracket each through holes being formed on said seat portion for screws to thread therethrough and thereby lock said locating bracket to said mounting holes formed on said monitor or said base; and said turning limit assemblies for controlling turning angles of said locating brackets relative to said supporting arms and said base, said turning limit assembly each including a rivet which extends through a first washer and a spring washer disposed at an inner side of one said circular end of one said supporting arm, and then through said central through hole of said circular end of said supporting arm, a second washer, a sleeve, and finally through a hole formed on said wall portion of said locating bracket and fixed thereto; and each said second washer being formed along an outer circumferential periphery with a limit cut for said lug projecting from each said circular end of said supporting arm to move in said limit cut.

3. A monitor assembly as claimed in claim 2, wherein said angle contained between said first and said second arm portions of said supporting arms it allows said monitor and said supporting arms to be turned to become parallel with said base.

4. A monitor assembly as claimed in claim 2, wherein said supporting arm assembly further includes a first and a second ornamental cover members and four connecting caps; said first and said second ornamental cover members being formed at end edges with supplementary flanges so that said first and said second ornamental cover members together fitly enclose said two supporting arms therebetween, and said four connecting caps respectively covering said locating brackets and being provided at predetermined positions with outward projected hooking means for engaging into mounting holes formed on said monitor and said base.

5. A monitor assembly as claimed in claim 2, wherein said angle contained between said first and said second arm portions is about 160 degrees.

6. A monitor assembly as claimed in claim 2, wherein said limit cuts formed on said second washers of said turning limit assemblies assembled to two circular ends of said first arm portions of said supporting arms connected to said monitor have a length different from the lenght of the limit cut formed on said second washers assembled to two circular ends of said second arm portions of said supporting arms connected to said base.

* * * * *